Nov. 14, 1961

C. H. LITTLE ET AL 3,009,141

DIGITAL TRANSDUCER

Filed Feb. 9, 1959

INVENTORS
CHARLES HUBBARD LITTLE
BY WALDO H. KLIEVER

ATTORNEYS

Nov. 14, 1961 C. H. LITTLE ET AL 3,009,141
DIGITAL TRANSDUCER
Filed Feb. 9, 1959 2 Sheets-Sheet 2

INVENTORS
CHARLES HUBBARD LITTLE
BY WALDO H. KLIEVER
Hudson, Boughton
Williams, David & Hoffmann
ATTORNEYS

3,009,141
DIGITAL TRANSDUCER

Charles Hubbard Little, Pepper Pike, and Waldo H. Kliever, Cleveland Heights, Ohio, assignors to Universal Drafting Machine Corporation, Cleveland, Ohio, a corporation of Ohio
Filed Feb. 9, 1959, Ser. No. 791,895
4 Claims. (Cl. 340—347)

The present invention relates to analog-to-digital converters in which mechanical motion is converted to digital signals. Converters of this type are commonly referred to as digital transducers.

One of the principal objects of the invention is the provision of a new and novel apparatus for converting mechanical motion into digital signals and which codes the signals both as to direction and increments of displacement and which apparatus will be economical in construction and reliable in operation.

Another of the principal objects of the invention is the provision of a novel apparatus of the character referred to comprising an analog transducer including scale and reader which converts mechanical motion into electrical impulses and an electric circuit which converts the impulses into signals, coded both as to direction and increments of displacement.

The invention resides in certain novel constructions and arrangements of parts, and further objects and advantages will appear from the following description of the preferred embodiment described with reference to the accompanying drawings, which form a part of this specification, and in which like reference characters designate corresponding parts throughout the several views, and wherein.

Figure 1:
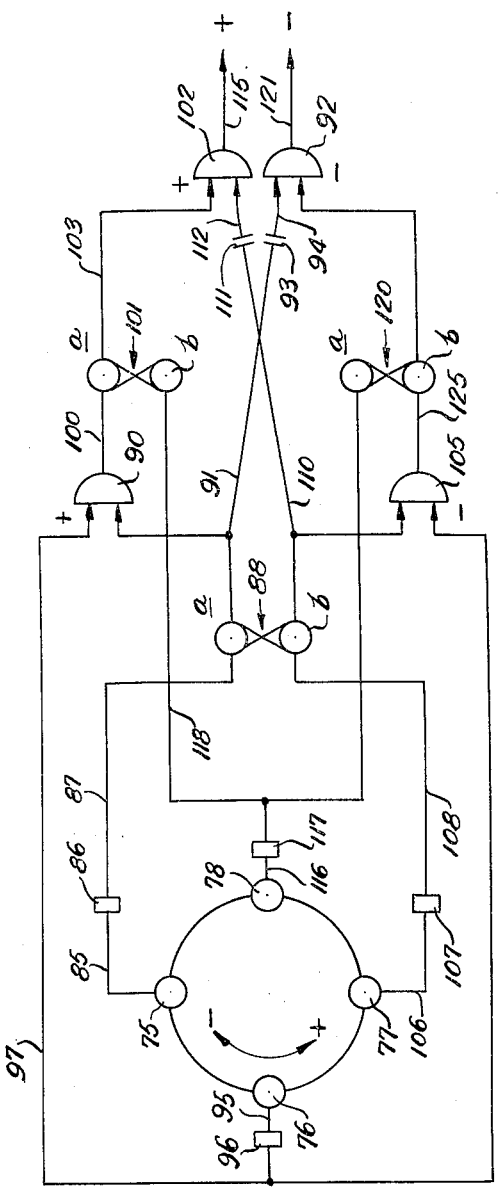
FIG. 1 is a circuit diagram of a digital transducer embodying the present invention.

The converter of the present invention includes an analog input transducer comprising a digital scale in the form of a member having a plurality of uniformly spaced digits or bits, reading means for the scale comprising a plurality of signal producing readers arranged in an operational sequence with the sequential spacing therebetween equal to the spacing of the digits or bits of the scale multiplied by a whole number plus a fraction of the spacing of the digits of the scale which fraction is the inverse of the number of readers employed, means for supporting the scale and the reading means for movement relative to one another, and a circuit for converting the sequence of signals produced by the readers into impulses coded both as to directional and increments of movement between the scale and the reading means.

In the preferred embodiment shown in the drawings, the scale is in the form of a disk 10 fixed to a shaft 11 rotatably supported in a housing 12. The digits or bits on the scale are in the form of uniformly spaced slot-like transparent areas of equal width arranged in a circle about the axis of rotation of the shaft 11. The width of the digits or slot-like areas shown is 2° and the spacing or pitch thereof is 10° with the result that the scale 10 shown comprises thirty-six equally spaced digits or bits 14–50.

Figure 2:
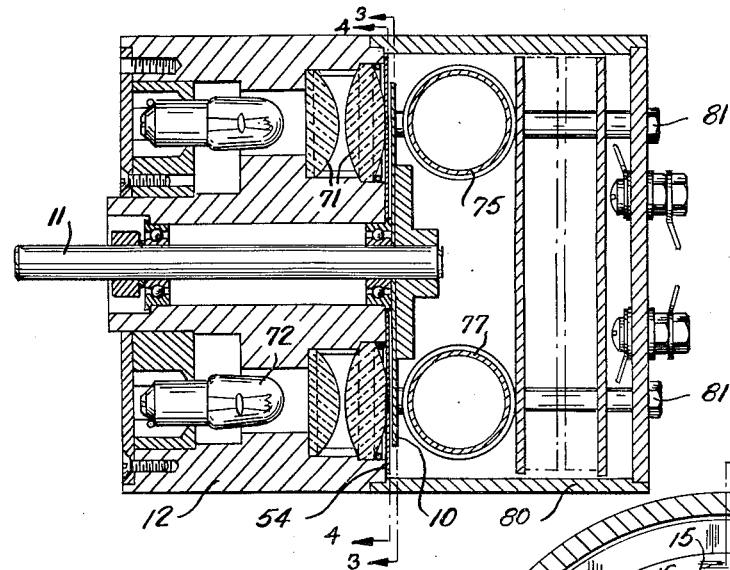
FIG. 2 is a sectional view of the apparatus of FIG. 1 for converting mechanical motion into electrical impulses.

The reading means shown comprises a divider in the form of a disk 54 fixed to the right-hand end of the housing 12 as viewed in FIG. 2 and comprising a series of reading areas, in the present instance four, designated 55, 56, 57, 58, each comprising a pair of slot-like transparent areas 60, 61. The reading areas 55–58 are spaced about the axis of rotation of the disk or scale 10 and the respective transparent areas of each reading area are of the same size and are located at the same distance from the axis of rotation of the scale as are the transparent areas or digits of the scale and the transparent areas 60, 61 within any respective reading area have the same spacing or pitch with respect to each other as that of the transparent areas of the scale. It will be apparent, however, that the spacing or pitch of the transparent areas in any one reading area may be a multiple of the pitch of the scale bits or digits. The transparent areas of any reading area are, in effect, a single area, the multiple areas 60, 61 being employed merely for the purpose of transmitting more light for any given transparent area width. The reading areas will be considered hereafter as though they merely contained the single transparent area 60.

The respective reading areas, as previously stated, are sequentially spaced a distance which is a whole number times the spacing of the digits of the scale plus a fraction of said scale digital spacing which fraction is the inverse of the number of readers or reading areas. In the embodiment shown, four of the reading areas beginning with the area 55 if the movement is counterclockwise and the area 57 if the direction is clockwise constitutes a series and the spacing or pitch between the areas 55 and 56, the areas 56 and 57, and the areas 57 and 58, is 92½°; that is, nine times the spacing or pitch of the digits or bits of the scale which is 10° plus ¼ of the scale digit or bit spacing or 2½°. The spacing between the reading areas 55 and 58 is 82½°; that is, eight times the scale digital spacing of 10° plus ¼ of the scale digital spacing or 2½°. From the foregoing description, it will be apparent that the transparent area or areas of each reading station will sequentially align with a transparent area of the scale upon each 2½° of angular movement of the scale in the order in which they are arranged about the axis of rotation of the scale. It will be apparent, however, that the physical positions of the reading areas need not coincide with the reading sequence.

The housing 12 is provided with a plurality of apertures 70 extending from one end to the other, each having a lens system 71 adjacent to its right-hand end which lens system provides a parallel light beam and aligns with one of the respective reading areas of the divider or disk 54. Each of the apertures 70 also contain a light source 72 in the form of a small incandescent bulb. In addition to the elements already mentioned, the reading means shown comprises a plurality of photocells 75–78 located at the right-hand side of the scale or disk 10 and aligned with the reading areas 55 to 58 respectively, of the divider disk 54. The photocells are supported in a housing 80 detachably connected to the housing 12 by a plurality of bolts 81 extending lengthwise through the housings. The particular arrangement, however, for supporting the scale and reading means forms no part of the present invention and any suitable arrangement may be employed.

While certain transparent area sizes have been herein referred to, and certain spacings or pitches mentioned, it is to be understood that other suitable sizes and spacings may be employed. The particular ones mentioned are merely for purposes of illustration. It is also to be understood that while a circular scale is shown and the reading means arranged accordingly, it is to be understood that a linear or other suitable scale forms may be employed with an appropriate rearrangement of the reading means. It is also to be understood that while the scale digits or bits and reading means shown include transparent areas, etc., and are what might be referred to as of the optical type, other forms or types of digits or bits and readers, such as, magnetic, contact, etc., may be substituted for the particular form shown.

Assuming that the scale disk 10 is rotated counterclockwise, the photocells 75, 76, 77, 78 are sequentially illuminated for short intervals in the order or sequence in which they are mentioned, a first electrical signal is transmitted by the photocell 75 by way of a conductor 85, an amplifier 86, and a conductor 87 to a bi-stable multivibrator or flip-flop 88 such that the side designated *a* becomes conductive and impresses a potential or control impulse upon a gate 90 by way of a conductor 91 and upon a gate 92 by way of the conductor 91, a condenser 93 and a conductor 94. Nothing, however, happens at this time since the gates are in their closed or cutoff conditions. The flip-flop 88 is herein referred to as the directional flip-flop as it codes the direction of displacement of the movement being converted, as will be hereinafter explained.

Upon the sequentional illumination of the photocell 76, an electric signal is transmitted by a conductor 95, an amplifier 96, and a conductor 97 to the gate 90 causing it to open or become conductive and to impress a control signal over the conductor 100 on a bi-stable multivibrator or flip-flop 101 such that the side *a* thereof becomes conductive and impresses a control signal upon a gate 102 over the conductor 103 which gate is now in cutoff condition or closed. The signal initiated by activation of the photocell 75, however, is stored in the multivibrator 101. Simultaneously with the impressing of the signal upon the gate 90 by activation of the photocell 76, the same signal is impressed through the conductor 97 upon a gate 105, which gate, however, is in cutoff or closed condition at this time.

Upon continued rotation of the scale 10 in the counterclockwise direction, the photocell 77 is sequentially illuminated causing an electrical signal to be transmitted by a conductor 106, an amplifier 107, and a conductor 108 to the other or side *b* of the bi-stable multivibrator or flip-flop 88 causing the flip-flop 88 to reverse, interrupting the previously conducting side *a* and causing the side *b* to become conductive and impress a control signal by way of its output circuit or conductor 110 upon the gate 105 directly connected thereto and a control impulse upon the gate 102 connected to the conductor 110 by way of a condenser 111 and a conductor 112. The impressing of the control signal upon the gate 105 does not cause a subsequent operation at this time because the gate is closed. The impressing of the control impulse upon the gate 102 as a result of illumination of the photocell 77, however, causes the gate 102 to open or become conductive allowing the signal stored in the flip-flop 101 to pass on through an output conductor 115 to a suitable preselected apparatus.

Upon continued rotation of the scale 10 in the counterclockwise direction, the photocell 78 is sequentially illuminated causing a signal to be sent through a conductor 116, amplifier 117, and conductor 118 to the flip-flop 101, resetting the flip-flop 101, to its original position, conducting through its side *b*. The same signal is transmitted by the conductor 118 to a bi-stable multivibrator or flip-flop 120 to maintain the side *a* nonconductive or cause the side *a* to become nonconductive, if conductive.

Figure 3:
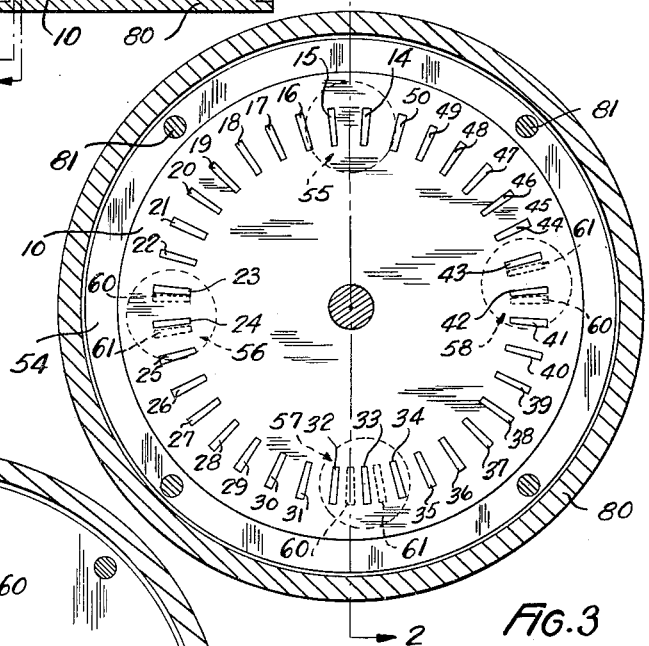
FIG. 3 is a sectional view approximately on the line 2—2 of FIG. 2.
Figure 4:
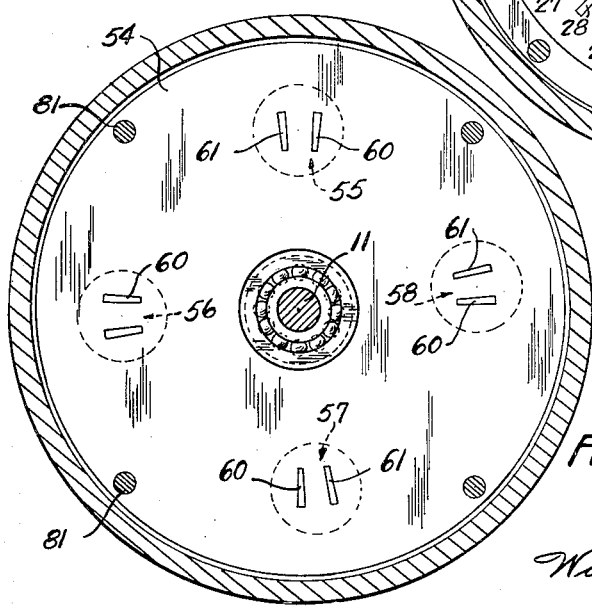
FIG. 4 is a sectional view approximately on the line 3—3 of FIG. 2.

Continued rotation of the scale 10 in the counterclockwise direction will cause the series of operation just referred to to be repeated, and digital impulses to be periodically impressed upon or transmitted over the conductor 115, each of which impulses represents a unit or increment of displacement of the shaft 11 in the counterclockwise direction as viewed in FIG. 3.

If the shaft 11 is rotated in the reverse direction the photocells will be illuminated in the reverse order to that just described and starting with the photocell 77 in place of the photocell 75 and interchanging or substituting for the reference characters 85, 86, 87 etc., the reference characters 106, 107, 108 etc., the sequence of operations will be the same but the reverse of that just described and an output digital impulse will be transmitted over a conductor 121 in place of the conductor 115.

Illumination of the photocell 77 will impress a signal upon the flip-flop 88 causing its side *b* to become conductive impressing a control signal or impulse upon the gates 102, 105 in a manner previously described. These gates, however, are closed at this time. The next signal will occur upon illumination of the photocell 76. This will impress a signal upon gates 90, 105. The gate 90, however, is closed, but the gate 105 will become conductive to impress a control signal by way of the conductor 125 upon the side *b* of flip-flop 120 causing it to become conductive and impress a control signal by way of the conductor 126 upon the gate 92 which gate is now closed. Continued rotation of the scale 10 in the clockwise direction will activate the photocell 75 reversing the flip-flop 88 impressing an impulse upon the gate 92 and through the gate 92 upon the output conductor 121. Sequential illumination of the photocell 78 will reset the flip-flop 120 to its original condition.

From the foregoing it will be apparent that the first of photocells 75, 77 to be actuated, in effect codes the direction of movement; the signal from the photocell 76 is then stored in the flip-flop 101 or 120 depending upon the selection made by the particular photocell 75, 77 to be first illuminated; and the signal produced by the sequentially illuminated photocell of the photocells 75, 77 causes an impulse to be transmitted over the ouput circuits 115, 121 depending upon the selection previously made. If the rotation of the scale is stopped and reversed before the three photocells mentioned are sequentially illuminated, the circuits previously established, are, in effect, de-activated as no signal is transmitted over either of the output conductors 115 or 121, except upon the sequential illumination of the three photocells in one direction or the other.

The gates, flip-flops etc., shown may be of any suitable construction and are not herein shown and described in detail. Suffice it to say that they are preferably of the transistor type and that the gates are of the end-type.

Figure 5:
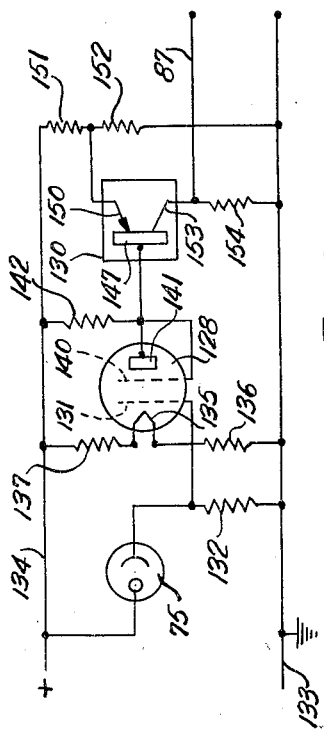
FIG. 5 is a circuit diagram of one of the amplifier circuits shown in FIG. 1.

While the amplifiers 86, 96, 107, 117 may be of any suitable construction, the amplifiers shown are located within the housing 80 to the right of the photocells and they are each similar to that shown in FIG. 5 and comprise a sub-miniature tetrode amplifier tube 128 and a transistor 130.

The first control grid 131 of the tube 128 is connected to the cathode of the photocell 75 and through a suitable load resistance 132 to the negative side 133 of a suitable direct current supply. The anode of the photocell 75 is connected to the positive side 134 of the current supply. One side of the cathode 135 of the tube 128 is connected to the negative supply conductor 133 by a resistance 136 and the opposite side of the supply line 134 by a resistance 137. The second grid 140 and the plate 141 of the tube 128 are connected directly to the base 147 of a PNP type transistor 130 and to the supply line 134 by a resistance 142. The emitter 150 of the transistor 130 is connected through a resistance 151 to the supply line 134 and through a leak resistance 152 to the supply line 133. The collector 153 of the transistor 130 is connected to the output or load conductor, in this instance the conductor 87 previously referred to, and by a load resistance 154 to the supply line 133. In the embodiment shown, the supply consists of a 24 volt direct current circuit, the negative side of which is connected to the conductor 133 and is grounded, and the positive side of which is connected to the conductor 134.

Values of the resistors shown in FIG. 5 are as follows:

| | | |
|---|---|---|
| 130 | megohms | 2.2 |
| 136 | ohms | 180 |
| 137 | do | 2,200 |
| 142 | do | 22,000 |
| 151 | do | 100 |
| 152 | do | 2,200 |
| 154 | do | 1,000 |

From the foregoing description of the preferred embodiment of the invention it will be apparent that the objects heretofore enumerated and others have been accomplished and there has been provided a new and novel apparatus for converting mechanical motion into digital impulses, coded both as to direction and increments of displacement. While the preferred embodiment of the invention has been described in considerable detail, the invention is not limited to the particular construction and arrangement of parts and circuits shown and it is the intention to hereby cover all adaptations, modifications and uses thereof which come within the practice of those skilled in the art to which the invention belongs.

Having thus described our invention, what we claim is:

1. In an apparatus for converting mechanical motion into digital impulses coded as to both direction and increment of displacement; a scale member having a plurality of equally spaced bits; first, second, third and fourth readers arranged in an operational sequence with the spacing of sequential readers equal to the pitch spacing of said bits of said scale member multiplied by a whole number plus a fraction of the spacing of said bits of said scale member which fraction is the inverse of the number of said readers; means for producing relative movement between said scale and said readers in response to said mechanical motion whereby electrical impulses are caused to be produced sequentially; means for transmitting said impulses produced by said first and third readers having said second reader operatively interposed therebetween to the first and second input circuits respectively, of a first bi-stable multivibrator the first and second output circuits of which are, respeceively, connected to control inputs of first and second gates and to pulse inputs of third and fourth gates; means for transmitting the impulses produced by said intermediate second reader to said first and second gates; means connecting the output circuits of said first and second gates to the first input circuit of second and third bi-stable multivibrators, respectively, and the corresponding output circuits of said second and third bi-stable multivibrators to said fourth and third gates, respectively; and means for connecting the impulse of said fourth reader operationally, sequentially spaced from said intermediate second reader on the opposite side of one of said first and third readers, to the second input circuits of said second and third bi-stable multivibrators, said third and fourth gates having output circuits energized respectively in response to different sequences of said impulses produced by said readers.

2. In an apparatus for converting mechanical motion into digital impulses coded as to both direction and increment of displacement; a scale member having a plurality of alternating opaque areas of uniform width and transparent areas of uniform width; a divider member having first, second, third and fourth reading areas each having a transparent area the width of which is substantially the same as the width of the transparent areas of the scale member; means supporting said scale member and said driver member adjacent to one another for relative movement in either of two opposite directions; said reading areas of said divider member being arranged in an operational sequence with the spacing of sequential reading areas equal to the spacing of said transparent areas of said scale member multiplied by a whole number plus a fraction of the spacing of said transparent area of said scale which fraction is the inverse of the number of said reading areas in said sequence; light means on one side of said scale and divider members; photocells on the opposite side of said scale and divider members from said light means and coinciding with said series of reading areas on said divider member; means for producing relative movement between said scale and said divider member in response to said mechanical motion whereby electrical impulses are caused to be produced sequentially; means for transmitting said impulses produced by first and second of said reading areas, having a third of said reading areas operationally, sequentially interposed therebetween, to the first and second input circuits, respectively, of a first bi-stable multivibrator the first and second output circuits of which are respectively, connected to first and second gates and to pulse inputs of third and fourth gates; means for transmitting the impulses produced by said intermediate third reading area to said first and second gates; means connecting the output circuits of said first and second gates to the first input circuit of second and third bi-stable multivibrators, respectively, and the corresponding first output circuits of said second and third bi-stable multivibrators to said fourth and third gates, respectively; and means for connecting the impulse of a fourth of said reading areas operationally, sequentially spaced from said intermediate third reading area on the opposite side of one of said first identified reading areas, to the second input circutis of said second and third bi-stable multivibrators, said third and fourth gates having output circuits energized respectively in response to different sequences of said impulses produced by said readers.

3. In an apparatus for converting mechanical motion into digital impulses coded as to both direction and increment of displacement; a scale member having a plurality of alternating opaque areas of uniform width and transparent areas of uniform width; a divider member having a series of reading areas of a plurality of transparent areas the width of each of which said transparent area is substantially the same as the width of the transparent areas of the scale member and the spacing of which transparent areas within each reading area is equal to the spacing of the transparent areas of said scale member; means supporting said scale member and said divider member adjacent to one another for relative movement in either of two opposite directions; said reading areas of said divider member being arranged in an operational sequence with the spacing of sequential reading areas equal to the spacing of said transparent areas of said scale member multiplied by a whole number plus a fraction of the spacing of said transparent areas of said scale which fraction is the inverse of the number of said reading areas in said sequence; light means on one side of said scale and divider members; photocells on the opposite side of said scale and divider members from said light means and coinciding with said series of transparent areas on said divider member; means for producing relative movement between said scale and said divider member in response to said mechanical motion whereby electrical impulses are caused to be produced sequentially; means for transmitting said impulses produced by first and second of said reading areas having a third of said reading area operatively, sequentially interposed therebetween to the first and second input circuits of a first bi-stable multivibrator the first and second output circuits of which are, respectively, connected to first and second gates and to pulse inputs of third and fourth gates; means for transmitting the impulses produced by said intermediate third reading area to said first and second gates; means connecting the output circuits of said first and second gates to the first input circuit of second and third bi-stable multivibrators, respectively, and the corresponding first output circuits of said second and third bi-stable multivibrators to said fourth and third gates, respectively; and means for connecting the impulses of a fourth reading area operationally sequentially spaced from said intermediate third reading area on the opposite side of one of said first identified reading areas, to the second input circuit of said second and third bi-stable multivibrators, said third and fourth gates having output circuits energized respectively in response to different sequences of said impulses produced by said readers.

4. In an apparatus for converting mechanical motion into digital impulses coded as to both direction and increment of displacement; a scale member having a plurality of alternating opaque areas of uniform width and transparent areas of uniform width; a divider member having a series of reading areas of a plurality of transparent areas the width of each of which said transparent area is substantially the same as the width of the transparent areas of the scale member and the spacing of which transparent areas within each reading area is equal to the spacing of the transparent areas of said scale member; means supporting said scale member and said divider member adjacent to one another for relative movement in either of two opposite directions; said reading areas of said divider member being arranged in an operational sequence with the spacing of sequential reading areas equal to the spacing of said transparent areas of said scale member multiplied by a whole number plus a fraction of the spacing of said transparent areas of said scale which fraction is the inverse of the number of said reading areas in said sequence; light means on one side of said scale and divider members; photocells on the opposite side of said scale and divider members from said light means and coinciding with said series of transparent areas on said divider member; means for producing relative movement between said scale and said divider member in response to said mechanical motion whereby electrical impulses are caused to be produced sequentially; and an electric circuit response to said impulses having two output circuits energized in response to direction and increment of displacement of said mechanical motion.

References Cited in the file of this patent
UNITED STATES PATENTS

| | | |
|---|---|---|
| 2,685,082 | Beman | July 27, 1954 |
| 2,733,430 | Steele | Jan. 31, 1956 |
| 2,770,798 | Roth | Nov. 13, 1956 |
| 2,774,957 | Towner | Dec. 18, 1956 |

OTHER REFERENCES

"Notes on Analog-Digital Conversion Techniques" (Susskind), published by Technology Press of M.I.T. (copyright 1957) (pp. 6–24 to 6–29 relied on).

UNITED STATES PATENT OFFICE
CERTIFICATE OF CORRECTION

Patent No. 3,009,141                                               November 14, 1961

Charles Hubbard Little et al.

It is hereby certified that error appears in the above numbered patent requiring correction and that the said Letters Patent should read as corrected below.

Column 5, line 42, for "respeceively" read -- respectively --; line 68, for "driver" read -- divider --; column 6, line 27, for "circutis" read -- circuits --.

Signed and sealed this 17th day of April 1962.

(SEAL)
Attest:

ESTON G. JOHNSON                                    DAVID L. LADD

Attesting Officer                                         Commissioner of Patents